United States Patent
Vandivier

(10) Patent No.: US 6,831,978 B2
(45) Date of Patent: Dec. 14, 2004

(54) INTEGRATED REAR-VIEW MIRROR AND MICROPHONE ASSEMBLY

(75) Inventor: Karl Douglas Vandivier, Belleville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 09/683,947

(22) Filed: Mar. 6, 2002

(65) Prior Publication Data
US 2003/0169876 A1 Sep. 11, 2003

(51) Int. Cl.[7] .................................................. H04M 1/00
(52) U.S. Cl. ............. 379/454; 379/433.03; 379/420.03
(58) Field of Search ....................... 379/433.03, 420.03, 379/446, 454, 455; 381/86; 340/541

(56) References Cited

U.S. PATENT DOCUMENTS

| 5,140,455 A | | 8/1992 | Varaprasad et al. |
| 5,282,245 A | * | 1/1994 | Anderson ............... 379/433.03 |
| 5,940,503 A | | 8/1999 | Palett et al. |
| 6,026,162 A | | 2/2000 | Palett et al. |
| 6,089,721 A | | 7/2000 | Schierbeck |
| 6,124,886 A | | 9/2000 | DeLine et al. |
| 6,230,138 B1 | | 5/2001 | Everhart |
| 6,246,765 B1 | | 6/2001 | Palett |
| 6,262,831 B1 | | 7/2001 | Bauer et al. |
| 6,405,112 B1 | * | 6/2002 | Rayner ....................... 340/541 |

* cited by examiner

Primary Examiner—Jack Chiang

(57) ABSTRACT

A rear-view mirror assembly 10 is provided, including a housing 12 and a reflective surface 14. At least one microphone 18 is positioned behind the reflective surface 14 within the housing 12. At least one audio port 20 allows sound to pass through the reflective surface 14 to reach the at least one microphone 18.

18 Claims, 2 Drawing Sheets

US 6,831,978 B2

INTEGRATED REAR-VIEW MIRROR AND MICROPHONE ASSEMBLY

BACKGROUND OF INVENTION

The present invention relates generally to an automotive rear-view mirror assembly and more particularly to an integrated rear-view mirror and microphone assembly.

Automotive audio systems have expanded far beyond their simple am/fm radio roots. Modern systems serve not only as methods of delivering entertainment or information, but also as sources of interaction with the driver and passengers of the vehicle. Systems such as hands-free cell phones and voice-activated controls serve the dual purpose of increased customer convenience and increased automotive safety. Often, in fact, the convenience and safety characteristics are interrelated. Thus, the successful design and addition of such features to an automobile serves to increase customer satisfaction, and thereby have a beneficial effect on sales, as well as increase the overall safety of the vehicle, also with a net benefit on value and sales.

The development of these systems, however, is not concentrated solely on their basic operations. Successful systems must also be integrated smoothly into the overall automotive design. Customer satisfaction often drives the design of these systems to be inconspicuously integrated into the vehicle interior in order to preserve the appearance of the vehicle. Such has been the case with the design of microphone components for use within the vehicle audio system. Microphones play a vital and obvious role in a variety of audio systems. Their placement is often important to the proper operation of such systems. Especially when dealing with systems such as hands-free phones and voice controls, microphones must be placed such that a passengers voice can be monitored with minimal interference from background automotive noises. Often, however, such placement can be difficult in light of appearance issues.

One known location useful for mounting microphone hardware is in the rear-view mirror assembly. External mounting of objects or devices on the rear-view mirror assembly, however, can in many cases detract from the appearance of the automotive interior. In addition, visually obvious mountings or wires can prove distracting to a driver, which is also undesirable. One approach has been to design a mounting location within the mirror housing. Although this approach serves to preserve appearances, it can often result in increased packaging requirements and sizes for the mirror assembly. Some applications, such as convertibles, can have tight a-surface constraints that do not allow for a top or bottom mirror assembly mounted microphone. Other applications may develop mirror size constraints based upon mechanical or appearance constraints. In these and other applications it would be highly desirable to have an improved rear-view mirror and microphone assembly that did not negatively impact mirror size constraints and served to preserve the outward appearance of the rear-view mirror assembly.

SUMMARY OF INVENTION

It is, therefore, an object of the present invention to provide an integrated rear-view mirror and microphone assembly. It is a further object of the present invention to provide an integrated rear-view mirror and microphone assembly with reduced mirror sizing constraints.

In accordance with the objects of the present invention, a rear-view mirror assembly is provided. The rear-view mirror includes a housing and a reflective surface. At least one microphone is positioned behind the reflective surface within the housing. The rear-view mirror assembly further includes at least one audio port allowing sound to pass through the reflective surface to reach the at least one microphone.

Other objects and features of the present invention will become apparent when viewed in light of the detailed description of the preferred embodiment when taken in conjunction with the attached drawings and appended claims.

DETAILED DESCRIPTION

Figure 1:
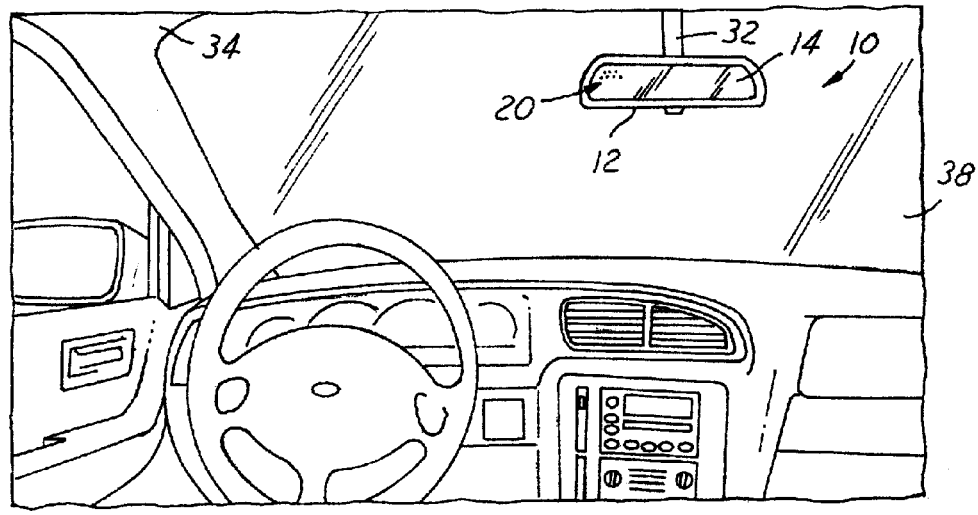
FIG. 1 is a illustration of an automotive interior containing an embodiment of a rear-view mirror assembly in accordance with the present invention.

Referring now to FIG. 1, which is an illustration of an automotive interior containing a rear-view mirror assembly 10 in accordance with the present invention. The rear-view mirror assembly 10 is intended to be utilized in a wide variety of vehicles for a wide variety of applications. These applications include, but are not limited to, hands-free phone systems, roadside assistance systems, and voice activated controls. The specific style and mounting configuration for the provided rear-view mirror assembly 10 is for illustrative purposes only, and a wide variety of variety styles and mounting configurations are compatible with the present invention.

Figure 2:
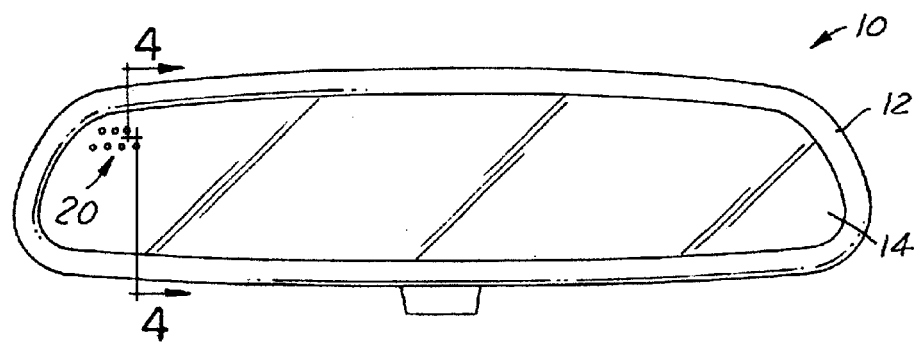
FIG. 2 is an front view illustration of an embodiment of a rear-view mirror assembly in accordance with the present invention.
Figure 3:
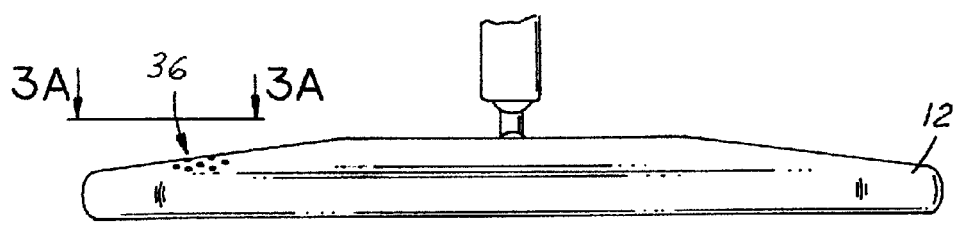
FIG. 3 is a top view illustration of an embodiment of a rear-view mirror assembly in accordance with the present invention.
Figure 3A:
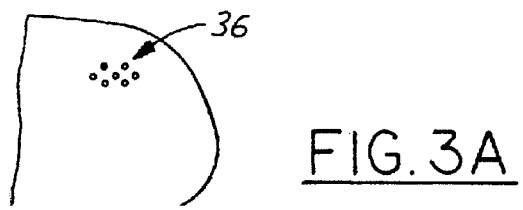
FIG. 3A is a detail of a portion of the rear-view mirror assembly illustrated in FIG. 3, the detail illustrating the rear audio ports.
Figure 4:
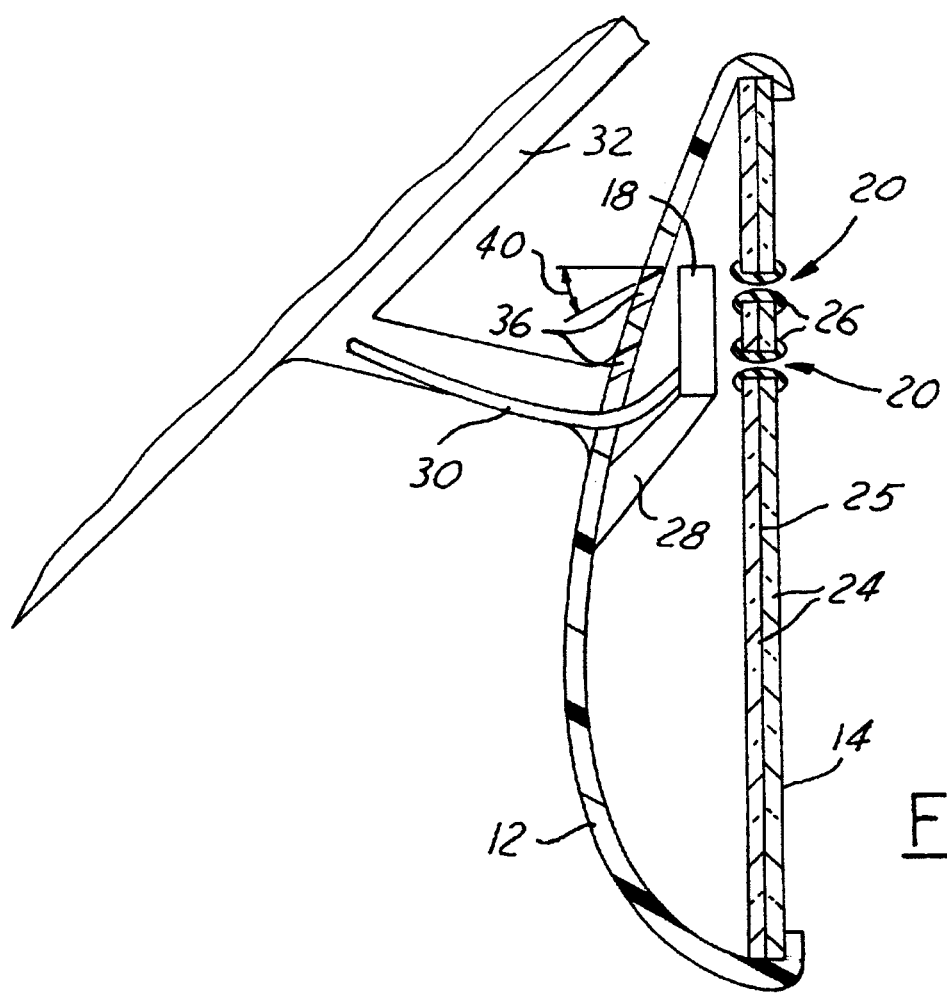
FIG. 4 is a cross-sectional view of the rear-view mirror assembly illustrated in FIG. 3, the cross section taken along the lines 4—4 in the direction of the arrows.

Referring now to FIG. 2, which is an illustration of an embodiment of a rear-view mirror assembly 10 in accordance with the present invention. The rear-view mirror assembly 10 includes a housing 12 and a reflective surface 14. A wide variety of materials and manufacturing techniques for producing rear-view mirrors are well known in the prior art and contemplated by the present invention. The present invention further includes at least one microphone 18 (see FIG. 4) positioned within the housing 12 behind the reflective surface 14. A vast number of styles and configurations of microphones 18 are known in the prior art and contemplated by the present invention. The specific form and configuration of the microphone 18 is often best chosen in relation to the audio system the microphone 18 is utilized in. The placement of the at least one microphone 18 behind the reflective surface 14 provides improved design flexibility for rear-view mirror design. The housing 12, for example, need not be expanded above or below the reflective surface 14 to provide a mounting location for the microphone 18. In other embodiments, however, the housing 12 can be extended, but the expanded area can be utilized for other features or components.

Although the microphone 18 may be positioned behind the reflective surface 14, it still must be able to remain in audio communication with passengers within the vehicle interior. Therefore, the present invention further includes at least one audio port 20 formed into the reflective surface 14 of the rear-view mirror assembly 10. It is contemplated that the audio ports 20 may be any one of a wide variety of configurations that allow audio signals to pass through the reflective surface 14 and reach the microphone 18. In one embodiment, however, it is contemplated that the at least one audio port 20 comprises a bore 22 through the reflective surface 14. Again, although a single audio port 20 may suffice, one embodiment contemplates a plurality of audio ports 20 to be utilized in the rear-view mirror assembly 10. Similarly, although the audio ports 20 may be formed as bores 22, in alternate embodiments they may comprise any material or formation that allows audio waves to pass through the reflective surface 14 to the microphone 18.

It is contemplated that it may be desirable to utilize the present invention on rear-view mirror assemblies that utilize advanced reflective surfaces 14. In one such known system, the reflective surface 14 is actually comprises of multiple layers 24 held together (see FIG. 4). Electronically activated material 25 may be positioned in between these multiple layers 24 in order to provide the reflective surface 14 with added function. It is contemplated that in uses such as these, the present invention can further include audio port seals 26. The audio port seals 26 are contemplated to be any coating or covering that seals the reflective surface 14 around the audio ports 20. They may be formed as part of the production of the reflective surface 14 or may be applied as a post manufacturing treatment. By sealing the audio ports 20, the present invention can be utilized in a wide variety of advanced mirror assemblies.

In one embodiment the present invention can further include a platform 28 formed into the housing 12 in which to mount the microphone 18. In alternate embodiments, the microphone 18 may be mounted within the rear-view mirror assembly 10 utilizing any of a variety of known methods. It is further contemplated that wires (communications cable) 30 may be utilized to connect the microphone 18 to an audio system (not shown) within the vehicle. Although a wide variety of methods are know, one embodiment contemplates running the wires 30 up a shield 32 (or casing) into the vehicle header 34 (see FIG. 1). From the vehicle header 34, the wires 30 may be run throughout the vehicle while remaining hidden from view. Alternate embodiments contemplate alternate wiring routes and wireless systems.

Finally, the present invention contemplates the use of at least one rear microphone port 36. The rear microphone ports 36 are formed in the housing 12 and are positioned behind the microphone 18. The rear microphone ports 28 provide a variety of advantages to the present invention. Some forms of microphones 18 perform better with a free moving body of air behind them. In addition, sound reflected off the windshield 38 may be allowed to penetrate the housing 12 to reach the microphone 18. In this fashion, the ability of the microphone 18 to pick up desired speech is improved. Although a single rear microphone port 36 may be utilized, one embodiment contemplates the use of a plurality of microphone ports 36. In still another embodiment, the rear microphone ports 36 are formed at a downward angle 40 relative to the normal of the reflective surface 14. This angle 40 can be utilized to prevent moisture or other liquid within the vehicle to flow through the rear microphone ports 36 and come into contact with the microphone 18. Other embodiments can alleviate this concern by utilizing waterproof microphones 18. A wide variety of microphones 18 and microphone casings are known in the art that can provide a waterproof or water resistant barrier.

While particular embodiments of the invention have been shown and described, numerous variations and alternative embodiments will occur to those skilled in the arm. Accordingly, it is intended that the invention be limited only in terms of the appended claims.

What is claimed is:

1. A rear-view mirror assembly comprising:
   a housing;
   a reflective surface mounted to said housing;
   at least one microphone, positioned within said reflective surface;
   at least one audio port allowing sound to pass through said reflective surface to reach said at least one microphone; and
   at least one rear microphone port formed in said housing, said at least one microphone port positioned behind said at least one microphone, said at least one rear microphone port is angled downward relative to the normal of said reflective surface to prevent moisture from entering said at least one rear microphone port.

2. A rear-view mirror assembly as described in claim 1, wherein said at least one audio port comprises a bore through said reflective surface.

3. A rear-view mirror assembly as described in claim 1, further comprising:
   at least one audio port seal.

4. A rear-view mirror assembly as described in claim 1, wherein said at least one audio port comprises a plurality of audio ports.

5. A rear-view mirror assembly as described in claim 1, wherein said at least one rear microphone port comprises a plurality of rear microphone ports.

6. A rear-view mirror assembly as described in claim 1, wherein said at least one microphone is a waterproof microphone.

7. A rear-view mirror assembly comprising:
   a housing;
   a reflective surface mounted to said housing;
   a plurality of audio ports formed in said reflective surface, said plurality of audio ports allowing sound to pass through said reflective surface;
   at least one microphone, positioned within said housing behind said plurality of audio ports; and
   at least one rear microphone port formed in said housing, said at least one microphone port positioned behind said at least one microphone, said at least one rear microphone port is angled downward relative to the normal of said reflective surface to prevent moisture from entering said at least one rear microphone port.

8. A rear-view mirror assembly as described in claim 7, wherein said plurality of audio ports comprise bores through said reflective surface.

9. A rear-view mirror assembly as described in claim 7, further comprising:
   a plurality of audio port seals, wherein said reflective surface comprises an electrically activated material positioned between a plurality of layers, said plurality of audio port seals sealing said reflective surface at each of said plurality of audio ports such that said electrically activated material is contained between said plurality of layers.

10. A rear-view mirror assembly as described in claim 7, wherein said at least one rear microphone port comprises a plurality of rear microphone ports.

11. A rear-view mirror as described in claim 7, wherein said at least one microphone is a waterproof microphone.

12. A rear-view mirror assembly as described in claim 7, further comprising:

a shield, said shield providing a covered passage for a communications cable to run from said at least one microphone to a header.

13. A rear-view mirror assembly as described in claim 7, wherein said at least one rear microphone port is positioned to allow sound reflected off a windshield to reach said at least one microphone.

14. A method of capturing sound in an automotive interior comprising:

passing the sound through a reflective surface of a rear-view mirror assembly by passing said sound through a plurality of audio ports formed in said reflective surface;

passing the sound through at least one rear microphone port formed in a housing of said rear-view mirror assembly, said at least one rear microphone port angled downward relative to the normal of said reflective surface to prevent moisture from entering said at least one rear microphone port; and receiving the sound using a microphone positioned behind said reflective surface.

15. A rear-view mirror as described in claim 1, wherein said at least one rear microphone port is positioned to allow sound reflected off a windshield to reach said at least one microphone.

16. A rear-view mirror assembly as described in claim 1, wherein said at least one audio port comprises a material formulated to allow audio waves to pass through said reflective surface.

17. A rear-view mirror assembly as described in claim 7, wherein each of said plurality of audio ports comprise a material formulated to allow audio waves to pass through said reflective surface.

18. A method as described in claim 14 further comprising:

reflecting the sound off a windshield to direct the sound at said at least one rear microphone port formed.

* * * * *